United States Patent
Choo et al.

(10) Patent No.: US 7,444,282 B2
(45) Date of Patent: Oct. 28, 2008

(54) METHOD OF SETTING OPTIMUM-PARTITIONED CLASSIFIED NEURAL NETWORK AND METHOD AND APPARATUS FOR AUTOMATIC LABELING USING OPTIMUM-PARTITIONED CLASSIFIED NEURAL NETWORK

(75) Inventors: Ki-hyun Choo, Seoul (KR); Jeong-su Kim, Gyeonggi-do (KR); Jae-won Lee, Seoul (KR); Ki-seung Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 783 days.

(21) Appl. No.: 10/788,301

(22) Filed: Mar. 1, 2004

(65) Prior Publication Data

US 2004/0172238 A1  Sep. 2, 2004

(30) Foreign Application Priority Data

Feb. 28, 2003  (KR) .................... 10-2003-0012700

(51) Int. Cl.
| | |
|---|---|
| *G10L 11/00* | (2006.01) |
| *G10L 21/00* | (2006.01) |
| *G10L 11/06* | (2006.01) |
| *G10L 21/06* | (2006.01) |
| *G10L 15/00* | (2006.01) |
| *G10L 15/16* | (2006.01) |
| *G10L 15/06* | (2006.01) |
| *G10L 13/00* | (2006.01) |
| *G06E 1/00* | (2006.01) |
| *G06E 3/00* | (2006.01) |
| *G06F 15/18* | (2006.01) |
| *G06G 7/00* | (2006.01) |
| *G06N 3/08* | (2006.01) |

(52) U.S. Cl. .................... 704/202; 704/201; 704/232; 704/243; 704/259; 706/20; 706/25

(58) Field of Classification Search ......... 704/200–202, 704/211, 213–218, 231–240, 243–245, 258–277; 706/15–20, 25, 45–48
See application file for complete search history.

(56) References Cited

U.S. PATENT DOCUMENTS 5,285,522 A * 2/1994 Mueller .................... 704/232

(Continued)

OTHER PUBLICATIONS

Ananth Sankar, et al., "Growing and Pruning Neural Tree Networks", IEEE Tranactions on Computers, vol. 42, No. 3, Mar. 1993, pp. 291-299.*

(Continued)

*Primary Examiner*—Talivaldis Ivars Smits
*Assistant Examiner*—David Kovacek
(74) *Attorney, Agent, or Firm*—Staas & Halsey LLP (57) ABSTRACT

A method of automatic labeling using an optimum-partitioned classified neural network includes searching for neural networks having minimum errors with respect to a number of L phoneme combinations from a number of K neural network combinations generated at an initial stage or updated, updating weights during learning of the K neural networks by K phoneme combination groups searched with the same neural networks, and composing an optimum-partitioned classified neural network combination using the K neural networks of which a total error sum has converged; and tuning a phoneme boundary of a first label file by using the phoneme combination group classification result and the optimum-partitioned classified neural network combination, and generating a final label file reflecting the tuning result.

34 Claims, 6 Drawing Sheets

U.S. PATENT DOCUMENTS

| | | | | |
|---|---|---|---|---|
| 5,461,696 | A | * | 10/1995 | Frank et al. .................. 704/232 |
| 5,509,103 | A | * | 4/1996 | Wang .......................... 704/232 |
| 5,621,857 | A | * | 4/1997 | Cole et al. ................... 704/232 |
| 5,621,858 | A | * | 4/1997 | Stork et al. .................. 704/232 |
| 5,638,487 | A | * | 6/1997 | Chigier ........................ 704/253 |
| 5,668,926 | A | * | 9/1997 | Karaali et al. ................ 704/232 |
| 5,737,716 | A | * | 4/1998 | Bergstrom et al. ........... 704/202 |
| 5,749,066 | A | * | 5/1998 | Nussbaum ................... 704/232 |
| 5,758,023 | A | * | 5/1998 | Bordeaux .................... 704/232 |
| 5,963,904 | A |   | 10/1999 | Lee et al. |
| 6,021,387 | A | * | 2/2000 | Mozer et al. ................. 704/232 |
| 6,947,890 | B1 | * | 9/2005 | Kitazoe et al. ............... 704/232 |

OTHER PUBLICATIONS

Eun-Young Park, et al., "Automatic Speech Synthesis Unit Generation with MLP Based Postprocessor Against Auto-Segmented Phoneme Errors", Dept. of Electronic Engr. Inha Univ. Inchon, Korea, Electronics and Telecommunication Research Institute, Korea © 1999 IEEE, pp. 2985-2988.

Doroteo Torre Toledano, "Neural Network Boundary Refining for Automatic Speech Segmentation", Telefonica Investigacion y Desarrollo, Emilio Vargas 6, 28043—Madrid, Spain © 2000 IEEE, pp. 3438-3441.

Abhinav Sethy, et al., "Refined Speech Segmentation for Concatenative Speech Snythesis", Speech Analysis and Interpretation Lab, Integrated Media Systems Center, Department of Electrical Engineering Systems, University of Southern California, XP-002370822.

Ki-Seung Lee, et al., "Context-Adaptive Phone Boundary Refining for a TTS Database", Dept. of Electronic Eng. Konkuk University, 1 Hwayang-dong, Gwangju-gu, Seoul, Korea 143-701, © 2003 IEEE, pp. I-252-I-255.

European Search Report issued Mar. 30, 2006 for Application No. 04251145.1—2218.

D. T. Toledano, "Neural Network Boundary Refining for Automatic Speech Segmentation," Proceedings of ICASSP-2000, pp. 3438-3441 (2000).

E. Y. Park et al., "Automatic Speech Synthesis Unit Generation with MLP based Postprocessor against Auto-segmented Phone Errors," Proceedings of International Joint Conference on Neural Networks, pp. 2985-2990 (1999).

* cited by examiner

METHOD OF SETTING OPTIMUM-PARTITIONED CLASSIFIED NEURAL NETWORK AND METHOD AND APPARATUS FOR AUTOMATIC LABELING USING OPTIMUM-PARTITIONED CLASSIFIED NEURAL NETWORK

CROSS-REFERENCE TO RELATED APPLICATIONS

This application claims priority from Korean Patent Application No. 2003-12700, filed on Feb. 28, 2003, in the Korean Intellectual Property Office, the disclosure of which is incorporated herein by reference.

BACKGROUND OF THE INVENTION

1. Field of the Invention

The present invention relates to automatic labeling used for speech recognition and speech synthesis, and more particularly, to a method and apparatus for rapidly and accurately performing automatic labeling by tuning a phoneme boundary by using an optimum-partitioned classified neural network of an MLP (Multi-Layer Perceptron) type.

2. Description of the Related Art

A speech corpus is a large collection of computer readable speech data, and is used as the basics for extracting a synthesis unit, and for phoneme and rhythm rules necessary for speech synthesis. In the case of speech recognition and speaker recognition, the speech corpus is an essential resource for training and evaluating a recognition algorithm. In addition to speech data, the speech corpus also contains index information about the speech data. Therefore, a specified word or sentence may be immediately heard after being accessed and speech materials including phoneme sequences or phonetic phenomena may be searched at will. Also, as speaker information is included in the speech corpus, several speech phenomena according to a speaker may be analyzed. In this case, labeling is used to provide additional information about several phonetic classifications in order to make the search possible. Units of labeling are a phoneme, word, syllable, sentence, etc.

In general, automatic phoneme labeling is performed with no user intervention from a given phoneme sequence and speech waveform data. But, in practice, due to errors between results of manual labeling and results of the automatic labeling, a tuning operation must be performed, usually after the automatic labeling. The tuning operation is repeatedly performed by an experience of a user via a synchronized listening of a manual labeling result and a speech signal. As such, considerable time is spent on this, and thus high-speed automatic labeling cannot be achieved.

In a phoneme labeling technique using an HMM (Hidden Markov Model), acoustic feature variables are segmented through a probability modeling procedure. Since the variables for the probability modeling are generated for a large speech corpus, a generated model for total training data may be considered as an optimum model. However, a phoneme segmentation technique using the probability modeling cannot reflect physical characteristics related to acoustic feature variables of a speech signal. Accordingly, the phoneme labeling using the HMM does not account for acoustic changes actually existing on a boundary between phonemes. On the other hand, speech segmentation techniques reflecting acoustic changes segment speech signal using only a transition feature of acoustic feature variables and slightly consider context information like automatic labeling. Therefore it is difficult to directly adapt a speech segmentation technique to automatic labeling.

Methods that adapt speech segmentation techniques to automatic labeling include, for example, a post-processing technique that tunes a result of automatic labeling. This method does not perform phoneme segmentation with speech segmentation, but phoneme segmentation using an HMM in advance, and then tunes phoneme segmentation by moving a detected phoneme boundary into a relatively small tuning field. Post-processing techniques include techniques using Gaussian model functions and techniques using neural networks to detect a phoneme boundary. In the last case, several feature variables based on MFCC (Mel Frequency Cepstral Coefficients) are used as input variables of a neural network, and error values of 0 and 1 are calculated at an output node by detecting whether present input feature variables are applicable to a phoneme boundary, and coefficients of the neural network are learned using a back-propagation algorithm. Because the neural network is not based on a probability modeling, this method has an advantage in that it can be directly used for automatic labeling. However, as the learned coefficients frequently converge to a local optimum and not a global optimum, according to the initial set of coefficients and learning data, label information tuned using the neural network may include more errors than label information obtained with only the HMM.

To solve this problem, a neural network is established by using all learning data, and the neural network is adaptively applied according to the appearance of smaller or larger errors depending on characteristics of left and right phonemes, assuming that the neural network is applied. For this, a relatively simplified method is used by which the characteristics of left and right phonemes are classified into vowels, consonants and mutes sounds. As such, the learning procedure depends on a user's information and the learning coefficients are determined only for a predetermined phoneme group.

Such a method is described by D. T. Toledano in "Neural Network Boundary Refining for Automatic Speech Segmentation," Proceedings of ICASSP-2000, pp. 3438-3441 (2000), and E. Y. Park, S. H. Kim and J. H. Chung in "Automatic Speech Synthesis Unit Generation with MLP based Postprocessor against Auto-segmented Phone Errors," Proceedings of International Joint Conference on Neural Networks, pp. 2985-2990 (1999).

SUMMARY OF THE INVENTION

The present invention provides a method which segments a number of L phoneme combinations into partitions applicable to a number of K neural networks set by an user, by searching the neural networks to have minimum errors with respect to L phoneme combinations, and then composing an optimum-partitioned classified neural network of an MLP (Multi-Layer Perceptron) type from re-learned partitions.

The present invention also provides a method and apparatus for rapidly and accurately performing automatic labeling by tuning a boundary of adjacent left and right phonemes using an optimum-partitioned classified neural network of an MLP type.

According to an aspect of the present invention, there is provided a method of setting an optimum-partitioned classified neural network including: obtaining a number of L phoneme combinations composed of names of left and right phonemes by using a phoneme boundary obtained by manual labeling; generating a number of K neural network combinations of an MLP type from learning data including input variables; searching for neural networks having minimum errors with respect to the L phoneme combinations from the neural network combinations or updated neural network combinations, and classifying the L phoneme combinations into K phoneme combination groups searched with the same neural networks; using the K phoneme combination groups classified in the searching for neural networks, updating weights until individual errors of the neural networks have converged during learning with applicable learning data for the K neural networks; and repeatedly performing the searching for neural networks and the using the K phoneme combination groups corresponding to the K neural networks of which the individual errors have converged until a total error sum of K neural networks, of which individual errors have converged in the using the K phoneme combination groups, has converged, and composing an optimum-partitioned classified neural network combination using the K neural networks obtained when the total error sum has converged.

According to another aspect of the present invention, there is provided a method of automatic labeling including: in a method of automatic labeling to tune a phoneme boundary of a first label file generated by performing automatic labeling of a manual label file, searching for neural networks having minimum errors with respect to a number of L phoneme combinations from a number of K neural network combinations generated at an initial stage or updated, updating weights during learning of the K neural networks by K phoneme combination groups searched with the same neural networks, and composing an optimum-partitioned classified neural network combination using the K neural networks of which a total error sum has converged; and tuning a phoneme boundary of a first label file using a phoneme combination group classification result and the optimum-partitioned classified neural network combination from the searching for neural networks, and generating a final label file reflecting the tuning result.

According to another aspect of the present invention, there is provided an apparatus for automatic labeling including: a labeling unit which generates a first label file by performing automatic labeling of a manual label file; an optimum-partitioned classified neural network composing unit which searches neural networks having minimum errors with respect to a number of L phoneme combinations from a number of K neural network combinations generated at an initial stage or updated, updates weights during learning of the K neural networks by K phoneme combination groups searched with the same neural networks, and composes an optimum-partitioned classified neural network combination using the K neural networks of which a total error sum has converged; and a phoneme boundary tuning unit which tunes a phoneme boundary of the first label file by using the phoneme combination group classification result and the optimum-partitioned classified neural network combination supplied from the optimum-partitioned classified neural network composing unit, and generating a final label file reflecting the tuning result.

Additional aspects and/or advantages of the invention will be set forth in part in the description which follows and, in part, will be obvious from the description, or may be learned by practice of the invention.

BRIEF DESCRIPTION OF THE DRAWINGS

These and/or other features and advantages of the invention will become more readily from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
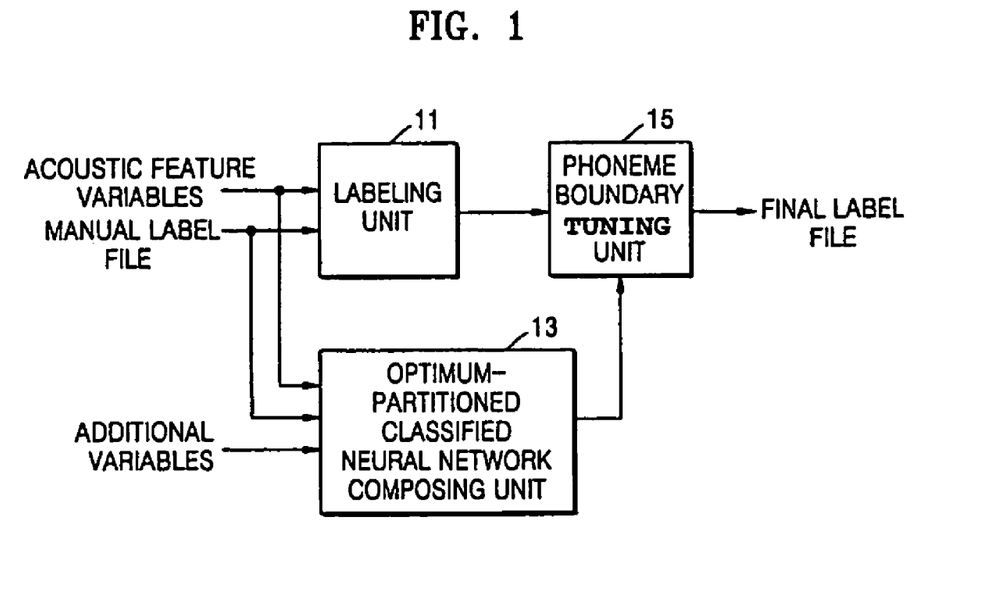
FIG. 1 is a block diagram of an apparatus for automatic labeling according to an embodiment of the present invention.

FIG. 1 is a block diagram of an apparatus for automatic labeling according to an embodiment of the present invention. The apparatus includes a labeling unit 11, an optimum-partitioned classified neural network composing unit 13, and a phoneme boundary tuning unit 15.

With reference to FIG. 1, a labeling unit 11 performs automatic labeling of a manual label file with using an HMM training and Viterbi decoding based on acoustic feature variables and generates a first label file. The acoustic feature variables may comprise MFCC (Mel Frequency Cepstral Coefficients). MFCC are used for the HMM phoneme segmentation, and preferably, MFCC for a total number of 4 consecutive frames are used as input variables. 13 MFCC are calculated for one frame, therefore, the total numbers of variables input to neural networks is 52.

An optimum-partitioned classified neural network composing unit 13 takes acoustic feature variables and additional variables as input variables, segments a number of L phoneme combinations into partitions applicable to a number of K neural networks defined by a user by searching neural networks having minimum errors with respect to the L phoneme combinations generated from the manual label file, and composes a number of K optimum-partitioned classified neural networks of an MLP type from re-learned partitions. The additional variable include ST-ZCR (Short-Term Zero Crossing Rate), SFTR (Spectral Feature Transition Rate), SKLD (Symmetrical Kullback-Leibler Distance), etc.

ST-ZCR is a value showing quantitatively how frequently a sign of a speech signal is changed within an optional section. ST-ZCR is an useful variable for phoneme segmentation in the case that phonemes applicable to voiced and unvoiced sounds are adjacent to each other because ST-ZCR has a meaningful histogram for the voiced sounds and unvoiced sounds. ST-ZCR has a comparatively small value in a voiced sound section in which there are few fluctuation components and has a large value in an unvoiced sound section that includes many components like white noise. SFTR shows a Euclidian distance of a linear function slope for each spectral feature variable in the case of expressing a spectral trace having a time variation as a linear function. SFTR is a variable showing how rapidly or slowly a spectral feature variable is changed at an optional time and has a local minimum value at the central part of a phoneme in which a spectrum has a stable value and has a comparatively large value in the transition section. Therefore, in the case of phoneme labeling, SFTR is used as an index factor of phoneme transition section or stable section.

As SKLD has characteristics emphasizing the spectral difference in a part having large energy. In the case of speech signals, a spectral distance may be obtained by adaptively emphasizing a part having important information related to context and speaker like format.

On the other hand, if neural networks of an MLP type are used in an optimum-partitioned classified neural network composing unit 13, nonlinear clustering is possible. Nonlinear clustering characteristics have, when a relationship between an input and an output is expressed by nonlinear cells, an advantage in properly modeling responding rules. In the MLP type, weights are obtained by an iterative modification, and the iterative modification is performed by a back-propagation algorithm which propagates errors of a top node corresponding to an output node to lower-layered neural networks.

The phoneme boundary tuning unit 15, which uses an optimum-partitioned classified result and optimum-partitioned classified neural network combination supplied from an optimum-partitioned classified neural network composing unit 13, tunes a phoneme boundary of a first label file supplied from a labeling unit 11 and generates a final label file reflecting the tuning result. That is, for tuning a phoneme boundary, by using an optimum-partitioned classified neural networks composed after completing learning in the optimum-partitioned classified neural network composing unit 13, the phoneme boundary tuning unit 15 judges a phoneme boundary according to whether an output is 1 or 0 after applying the same input variable as one used during a learning period into a neural network.

Figure 2:
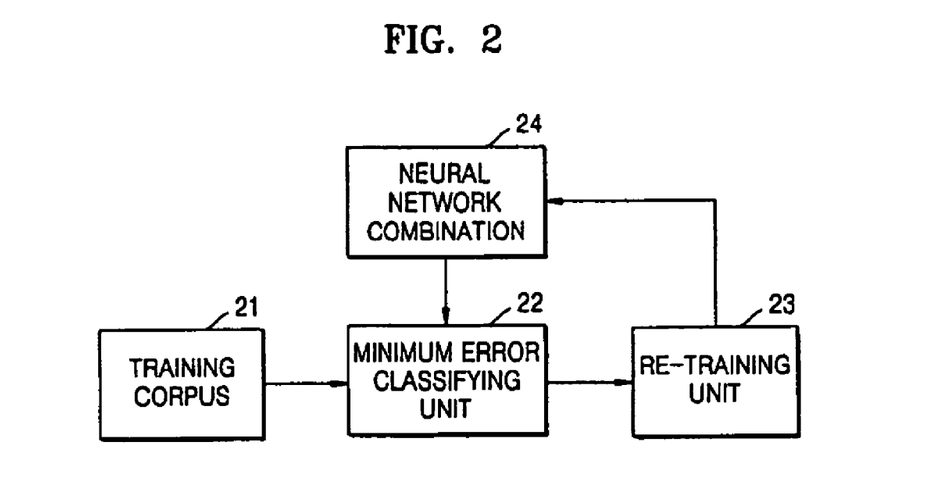
FIG. 2 is a block diagram of an optimum-partitioned classified neural network composing unit in FIG. 1.

FIG. 2 is a block diagram of the optimum-partitioned classified neural network composing unit 13 in FIG. 1. The optimum-partitioned classified neural network composing unit 13 includes a training corpus 21, a minimum error classifying unit 22, a re-training unit 23, and neural network combinations 24.

With reference to FIG. 2, the training corpus 21 stores input variables including acoustic feature variables and additional variables and a manual label file.

The minimum error classifying unit 22 generates a number of L phoneme combinations of names of left and right phonemes by using a phoneme boundary obtained from the input variables and manual label file stored in the training corpus 21. The minimum error classifying unit 22 searches an optimum neural network having minimum errors with respect to the L phoneme combinations from a number of K neural network combinations 24 of an MLP type and classifies the L phoneme combinations into K phoneme combination groups with the same neural networks. The number of K neural network combinations 24 is obtained by segmenting learning data including the input variables into K groups and using the segmented learning data.

The re-training unit 23 updates weights of the neural networks by learning with applicable learning data for the K neural networks as many as the predetermined number of iterations with respect to each of K phoneme combination groups classified in the minimum error classifying unit 22 and makes a total error converge by adapting the updated weights to an applicable neural network in the neural network combinations 24.

Figure 3:
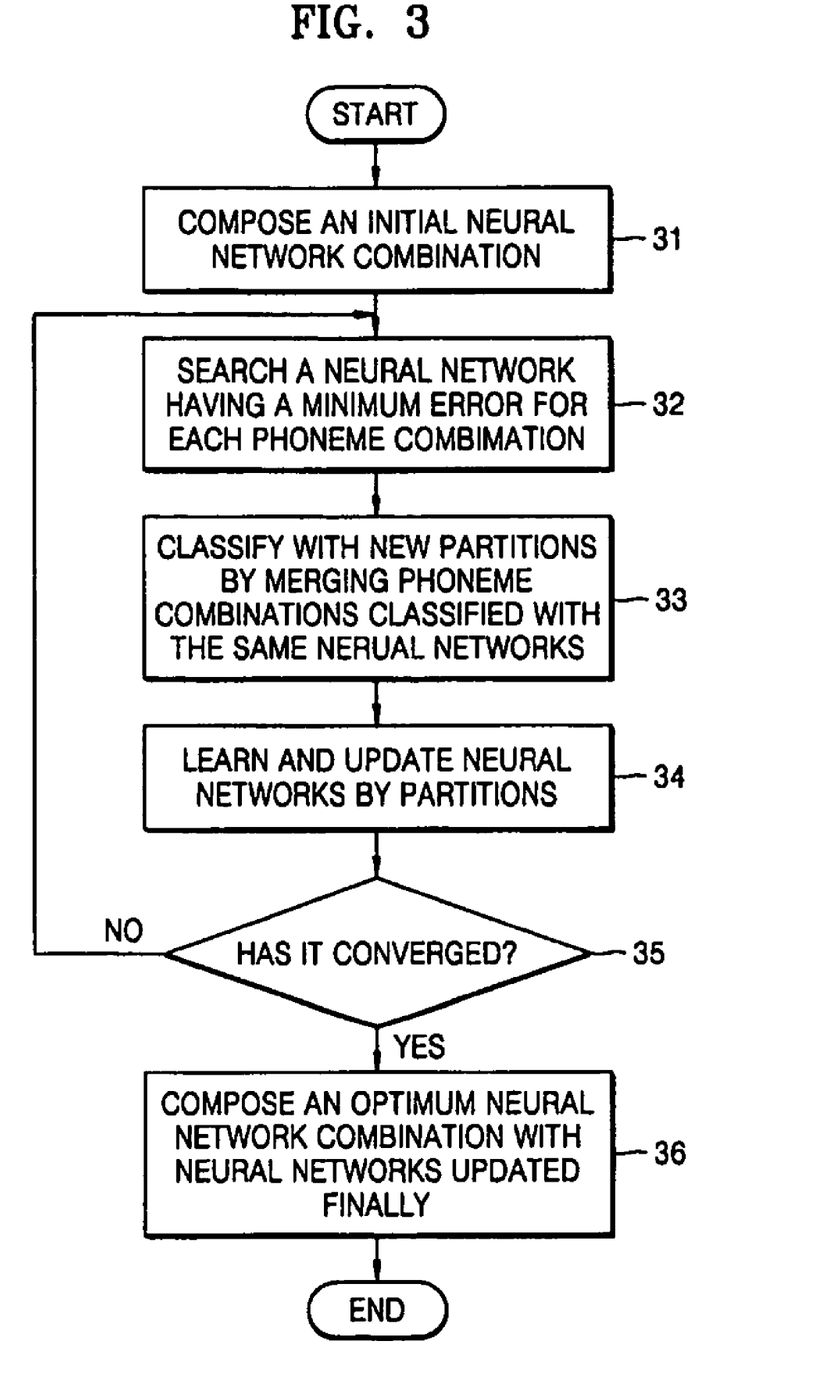
FIG. 3 is a flowchart that illustrates an operation of the optimum-partitioned classified neural network composing unit in FIG. 1.

FIG. 3 is a flowchart that illustrates an operation of the optimum-partitioned classified neural network composing unit 13 in FIG. 1. The operation of the optimum-partitioned classified neural network composing unit 13 includes an initializing 31, a classifying 32, a merging 33, a neural network training and updating 34, a convergence confirming 35, and an optimum-partitioned classified neural network composing 36.

With respect to FIGS. 2 and 3, the operation of the optimum-partitioned classified neural network composing unit 13 is as follows.

The optimum-partitioned classified neural network composing unit 13 composes a number of K optimum multiple neural networks from the given learning data. For this, first, initial multiple neural networks are composed and then a total error is gradually reduced by repeatedly performing classification and learning from learning data. A method of composing multiple neural networks is as follows.

In a neural network having one hidden layer, when an nth frame and an (n+1)th frame are adjacent to each other, an output y(n) corresponding to an input parameter $x_i(n)$ is given by Equation 1.

$$y(n) = f\left(\sum_{j=1}^{N_o} v_j f\left(\sum_{i=1}^{N_i} w_{ij} x_i(n)\right)\right) \quad \text{Equation 1}$$

where $v_j$ is a neural network weight between a hidden layer and an output layer, $w_{ij}$ is a weight from an input layer to a hidden layer, $N_i$ is the number of nodes in an input layer, $N_o$ is the number of nodes in a blind layer, and $f f(\ )$ is a sigmoid function.

An error e(n) at an output node is given by the following Equation 2.

$$e(n) = y^d(n) - y(n) \quad \text{Equation 2}$$

where $y^d(n)$ is a target output value and has a value of '1' if a phoneme boundary exists between the $n^{th}$ frame and the $(n+1)^{th}$ frame, and a value of '0' otherwise.

If $\Phi = [v_1, \ldots, v_{No}, w_{11}, \ldots, W_{Ni\ No}]$ is defined as a combination of all weights of the neural networks, and $X(n) = [x_1(n), \ldots, x_{Ni}(n)]$, then Equation 1 can be written as the following Equation 3.

$$y(n) = F(\Phi, X(n)) \quad \text{Equation 3}$$

where an input vector X(n) may be include MFCC applicable to the $(n-1)^{th}$, $n^{th}$, $(n+1)^{th}$ and $(n+2)^{th}$ frame, SFTR and SKLD calculated between the $n^{th}$ frame and the $(n+1)^{th}$ frame, and ST-ZCR calculated at the $n^{th}$ frame and the $(n+1)^{th}$ frame.

A weight updating value $\Delta\Phi$ of a neural network may be expressed using the following Equation 4.

$$\Delta\Phi = \eta e(n) + \nabla_{\Phi} y(n) \quad \text{Equation 4}$$

where $\eta$ is a learning gain (0<$\eta$<1).

When multiple neural networks are used, if a combination including these neural networks is defined as C, an optimum neural network combination $C^* = \{(\Phi_1, \Phi_2, \ldots, \Phi_k\}$ may minimize a total error sum (D) of all phoneme boundaries as shown in the following Equation 5.

$$D = \sum_{m=1}^{M} \min_{\Phi_k \in C^*} \left[ \sum_{n \in W_m} |y^d(n) - F(\Phi_k, X(n))|^2 \right]$$ Equation 5 where M is the number of total phoneme boundaries, and $W_m$ is a boundary field of $m^{th}$ phoneme boundary and may be expressed as the following Equation 6.

$$W_m = \left[ n \left| \frac{t_{m-1} + t_m}{2} \leq n \leq \frac{t_m + t_{m+1}}{2} \right. \right]$$ Equation 6 where $t_m$ is a nearest frame index from position of an $m^{th}$ phoneme boundary.

In order to compose a neural network minimizing the total error sum (D) defined by the Equation 5, input vectors of the neural network are segmented in a partition operation in advance, and then a classifying and relearning procedure is performed by the segmented partitions. These operations are performed in operations 31 through 36 in FIG. 3.

Figure 6:
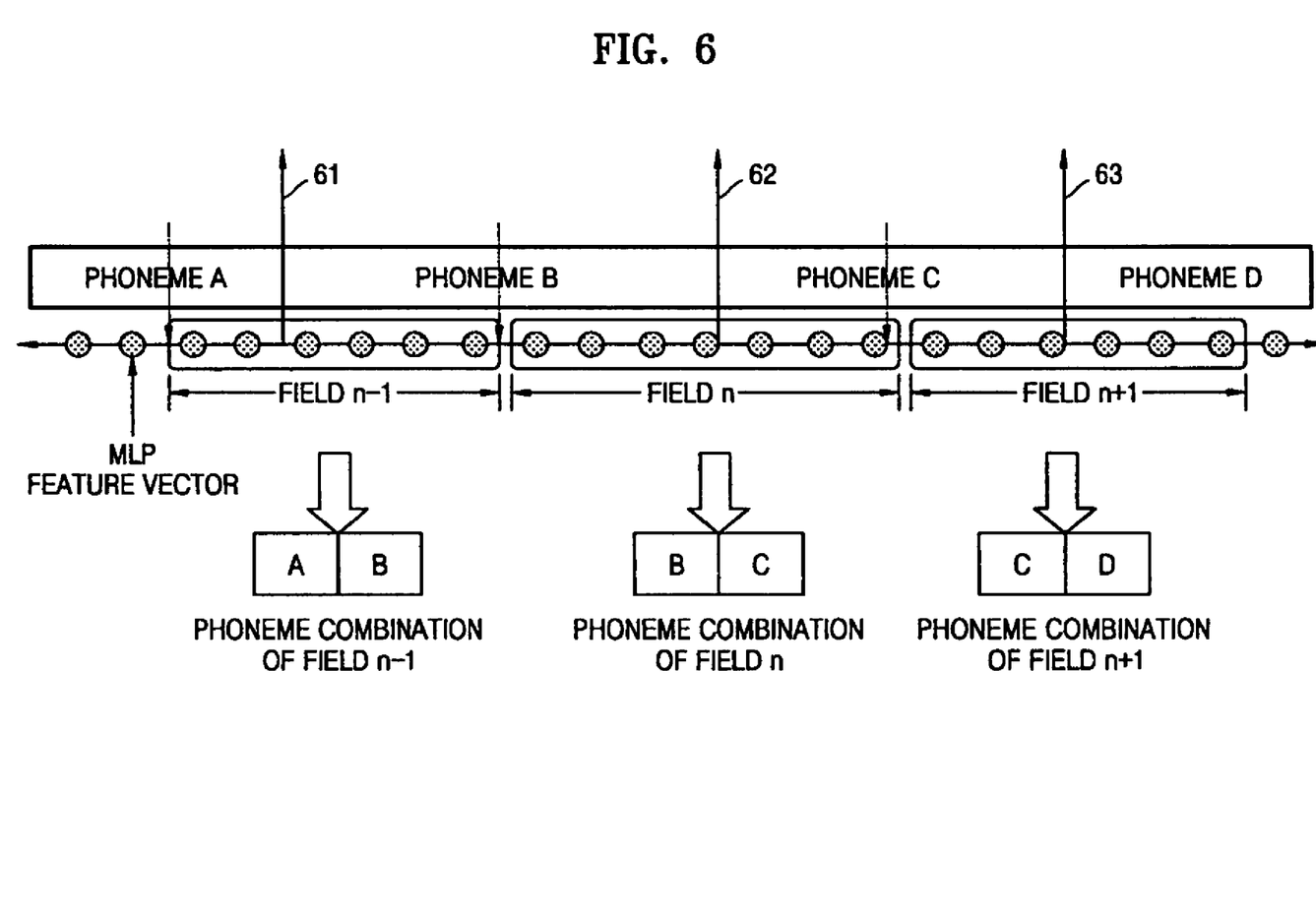
FIG. 6 illustrates a classification procedure according to phoneme combinations in FIG. 3.

With reference to FIG. 3, the operation 31 is an initializing step and sets learning data $[X(n), y^d(n)]_{n=1}^N$ for neural network learning and a first and a second threshold value $\epsilon_1$ and $\epsilon_2$ and prepares an initial neural network combination $C^0 = [\phi_k^0]_{k=1}^K$ in advance. An iteration times index (i) is set to 0, an initial error sum ($D_0(C_0)$) is set to infinity, and a position value $[t_m]_{m=1}^M$ of a phoneme boundary obtained by manual labeling is prepared. An initial neural network combination, that is, a number of K neural networks may be obtained by using a random number, or by using a method which segments learning data into K desired groups and learns each segmented partition by a back-propagation algorithm. All input variables included in the learning data are assigned in one of $N_p$ phoneme combinations as shown in FIG. 6. For instance, if an nth input data $X(n)$ is applicable to a $j^{th}$ phoneme combination, the input data is expressed as $X(n) \in P_j$. In the same way, phoneme combinations are assigned for all phoneme boundaries. That is, the above description may be expressed as $P_c(m)=j$, where $P_c(m)$ is a phoneme boundary index for an $m^{th}$ phoneme boundary, $1 \leq j \leq N_p$, $1 \leq n \leq N$, and $1 \leq m \leq M$.

Operation 32 is a classifying operation in which an optimum neural network having minimum errors with respect to phoneme combinations from an initial neural network combination is sought. An optimum neural network index $c_i(P_j)$ in an $i^{th}$ iteration for a $j^{th}$ phoneme combination ($P_j$) may be expressed like in the following Equation 7.

$$c_i(P_j) = \arg\min_k \left[ \sum_{P_c(m)=j} \sum_{n \in W_m} |y^d(n) - F(\Phi_k^i, X(n))|^2 \right]$$ Equation 7 where $W_m$ is a section in which input variables included in the $m^{th}$ phoneme boundary are selected like in the following Equation 8.

$$W_m = \left[ n \left| \frac{t_{m-1} + t_m}{2} \leq n \leq \frac{t_m + t_{m+1}}{2} \right. \right]$$ Equation 8 where $t_m$ is a nearest frame index from a position of the $m^{th}$ phoneme boundary.

As apparent from Equation 7, a total error of a $k^{th}$ neural network is given as a sum of square errors between a target output and an output obtained in the case of inputting all learning data included in the phoneme combination ($P_j$) to the $k^{th}$ neural network.

Operation 33 is a merging operation. If all phoneme combinations are classified with optimum neural networks through the classifying, phoneme combinations classified with the same neural network are merged and then classified in new partitions. An $k^{th}$ partition includes all phoneme combinations in which a $k^{th}$ neural network is selected as an optimum neural network. The $k^{th}$ partition may be expressed as shown in the following Equation 9.

$$s_k^i = [P_j | c_i(P_j) = k]$$ Equation 9 where $s_k^i$ is a $k^{th}$ partition at an $i^{th}$ iteration, i.e, a combination composed with all phoneme combinations included in the partition. When $s_k^i$ is expressed using input variables included in the learning data, $s_k^i$ may be expressed like in the following Equation 10.

$$s_k^i = [x(n) | X(n) \in W_m, \text{ where } P_c(m) = j, c_i(P_j) = k]$$ Equation 10

Next, a total error for a new partition may be expressed as shown in the following Equation 11.

$$D_{i+1}(S^i) = \sum_{m=1}^{M} \sum_{P_j \in s_k^i} \min \left[ \sum_{P_c(m)=j} \sum_{n \in W_m} |y^d(n) - F(\Phi_k^i, X(n))|^2 \right]$$ Equation 11 where i is an iteration times index, $S^i$ is a partition at an $i^{th}$ iteration and may be expressed like in the following Equation 12.

$$S^i = s_1^i \cup s_2^i \ldots \cup s_k^i$$ Equation 12

Operation 34 is an updating for individual neural networks, and learns neural networks according to partitions generated by the classifying and the merging. At this time, a weight update value of the $k^{th}$ neural network may be expressed like in the following Equation 13.

$$\Delta \Phi_k^i = \eta \sum_{s_i^k} \sum_{P_c(m)=j} \sum_{n \in W_m} |y^d(n) - F(\Phi_k^i, X(n))|^2$$ Equation 13

As is apparent from Equation 13, the applicable neural networks are updated with only data classified as the same neural networks of total learning data. Updating of individual neural networks is performed repeatedly by changing the update value obtained from the Equation 13. That is, the updating is performed repeatedly via a procedure that calculates an error using an updated neural network parameter $\Phi_k^i$ obtained through Equation 13 and updates $\phi_k^i$ according to this error. The updating ends when all k neural networks have converged, i.e., when an error changing rate is smaller than a first threshold value $\epsilon_1$. A new neural network combination $C^{i+1} = [\Phi_k^{i+1}]_{k=1}^K$ is composed with finally updated neural networks via the above operations.

Operation 35 is a convergence confirming to confirm whether there is a difference between a total error sum obtained from the current number of iterations and a total error sum obtained from the previous number of iterations, given by Equation 11. If a changing rate of a total error sum given from the following Equation 14 is smaller than a second threshold value $\epsilon 2$, the learning is finished, and if not, after increasing i by 1, operations 32 through 35 are repeated.

$$\Delta D = |D_{i+1}(C_i) - D_i(C_i)| \quad \text{Equation 14}$$

In operation 36, after convergence has been confirmed in operation 35, a neural network combination 24 obtained at this time is composed as an optimum-partitioned classified neural network combination.

After the total error sum has converged by repeatedly performing the classifying, merging and re-training of operations 31 through 36, a phoneme combination partitioning result obtained in operation 33 and an optimum-partitioned classified neural network obtained in the operation 36 are used for phoneme boundary tuning in the phoneme boundary tuning unit 15.

In the above-described method, an error satisfies $D_{i+1}(C_i) \leq D_i(C_i)$ after performing the minimum error classification of operations 32 and 33 for a neural network combination $C_i = [\Phi_k^i]_{k=1}^K$ generated after $i^{th}$ iteration. That is, for a given neural network combination, $N_p$ phoneme combinations are segmented as optimum partitions. In the operation 34, an optimum neural network having minimum errors with respect to the segmented partitions is re-learned. Therefore, after operation 34, the total error sum satisfies $D_{i+1} \leq D_i$.

When the neural networks obtained after operation 34 do not guarantee an optimum neural network with minimum errors, even though the number of iterations increases, the total error sum does not decrease gradually and an infinite iteration occurs. To prevent, neural networks are updated through a sufficient number of iterations by setting a learning gain η with a small value in operation 34 and a first threshold value $\epsilon_1$ for convergence investigation with a comparatively small value.

Figure 4:
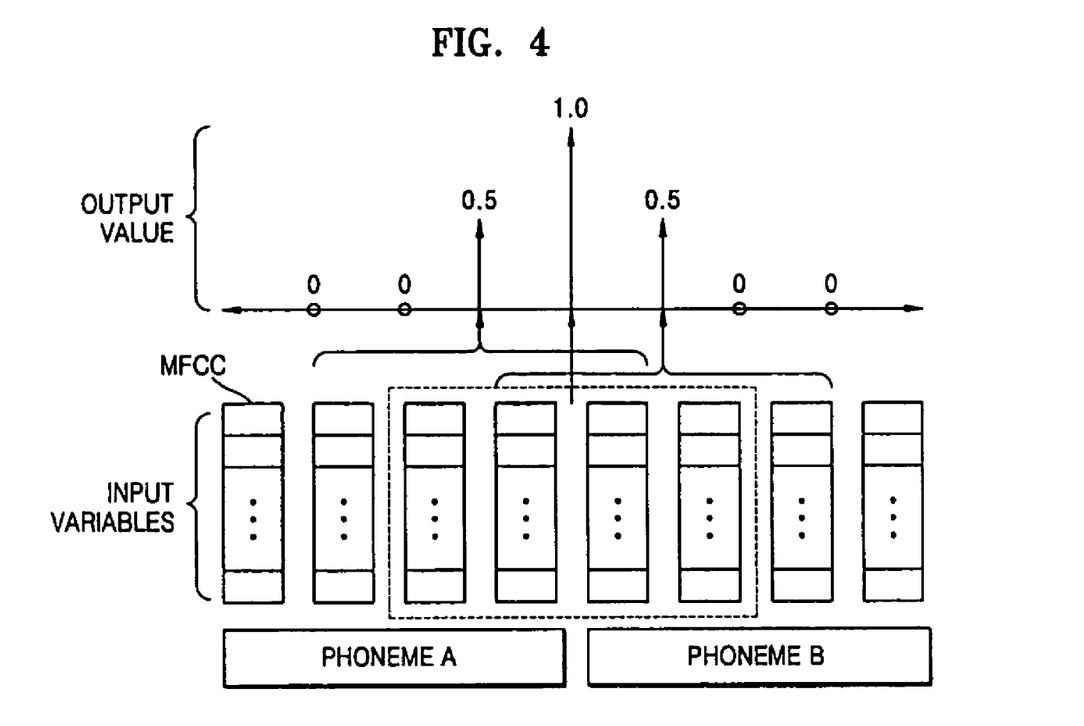
FIG. 4 illustrates a relationship between input variables and output values of a neural network.

FIG. 4 illustrates a relationship between input variables and output values in the neural network shown in FIG. 2. Input variables includes MFCC applicable to $(n-1)^{th}$, $(n)^{th}$, $(n+1)^{th}$, and $(n+2)^{th}$ frames and ST-ZCR, SFTR and SKLD calculated in $(n)^{th}$ and $(n+1)^{th}$ frames. An output value is set to 1 for the part applicable to a boundary between phonemes A and B, 0 for the part not applicable to the boundary between the phonemes A and B, and 0.5 for the part of 1 frame left or right apart from the phoneme boundary. That is, for limiting rapid fluctuations of neural network output values, a target output value between the $(n-1)^{th}$ frame and the $n^{th}$ frame is set to 0.5 and a target output value between the $n^{th}$ frame and the $(n+1)^{th}$ frame is also set to 0.5.

Figure 5:
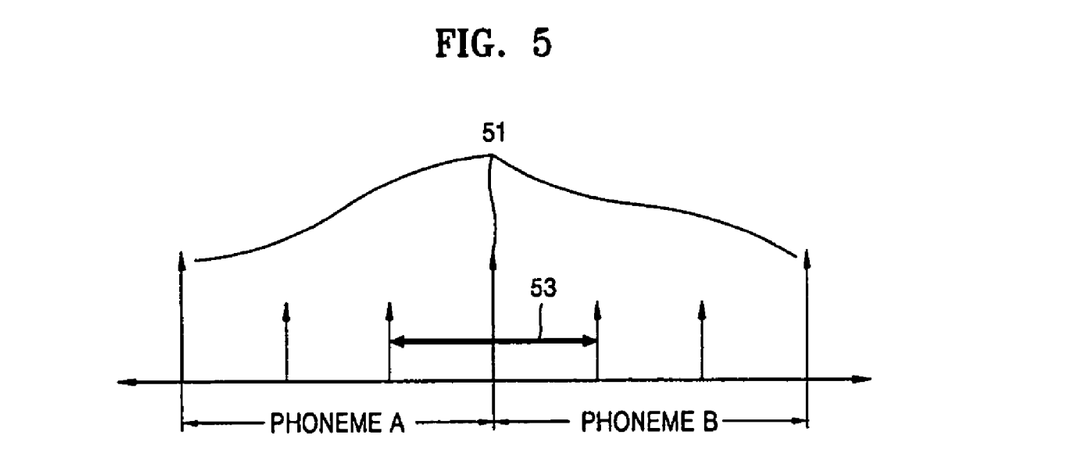
FIG. 5 illustrates a phoneme boundary tuning field.

FIG. 5 illustrates a phoneme boundary tuning field in the phoneme boundary tuning unit 15 shown in FIG. 1.

With reference to FIG. 5, for tuning a phoneme position near an automatic labeling phoneme boundary 51 by using the HMM, a tuning field 53 designates as a new phoneme boundary a position having a value near 1 of outputs of a neural network calculated during a duration time of left and right phonemes segmented into the predetermined number. Preferably, a tuning field 53 is set to a length which divides the duration time of left and right phonemes into three equal parts and segments one third each to the left and right near an automatic labeling phoneme boundary 51 by using the HMM.

FIG. 6 illustrates segmenting input variables of a neural network in the optimum-partitioned classified neural network composing unit 13 shown in FIG. 1. Reference numbers 61, 62, and 63 illustrate a phonemic boundary of manual labeling.

With reference to FIG. 6, for all input variables, an applicable phoneme combination according to a labeling phoneme name is assigned, and the assigned phoneme combination seeks the nearest phoneme boundary from positions of input variables and decides which name of two phonemes are connected to this boundary. For example, a nearest phoneme boundary to a field n is a phoneme boundary 62 positioned in the center and connected with phonemes B and C. Therefore, all MLP feature vectors included in the field n have a phoneme combination of B+C. Like this, a phoneme combination of input variables is decided by a phoneme boundary.

When input variables are segmented with this method, the number of total partitions is the square of the number of used phonemes. For example, when 54 basic phonemes are used, input vectors are divided into 54*54=2516 partitions. This is the maximum number of possible partitions, but combinations with meaning in contextual of the 2516 partitions are about 1000 partitions. As many new partitions as the number of predetermined individual neural networks are generated by merging about 1000 partitions. At this time, it is preferable that the number of individual neural networks K is set to the same value as or less than the number of partitions L by a phoneme combination.

Figure 7:
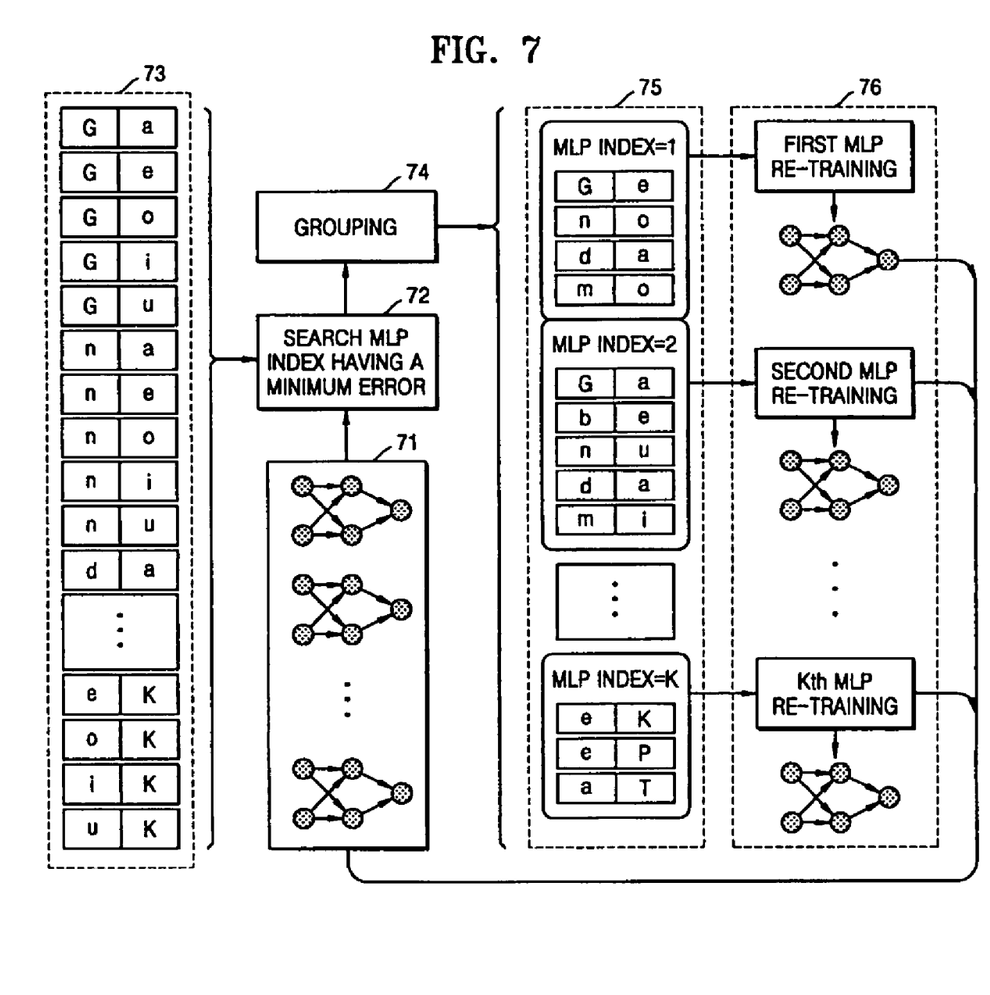
FIG. 7 is a sequence diagram of an optimum-partitioned classified neural network learning procedure using the phoneme information of FIG. 3.

FIG. 7 illustrates the learning and updating of a neural network in operation 34 in FIG. 3. First, initial neural network combinations 71 composed of K neural networks of MLP type are prepared. Then, an MLP searching unit 72 searches an MLP index having a minimum error in the initial neural network combinations 71 of all possible phoneme combinations 73. A classifying unit 74 classifies the merged phoneme combinations into K new partitions 75 by merging phoneme combinations with the same MLP index if the MLP index having a minimum error for all phoneme combinations 73 is searched in the MLP searching unit 72. Neural networks of an applicable MLP type 76 are retrained to then update their weights by learning data applicable to each partition. A re-training procedure of individual neural networks calculates errors using the updated weights and repeats the re-training until a changing rate of errors becomes smaller than a first threshold value $\epsilon_1$. Also, total procedures, that is, operations 32 through 35 are repeatedly performed until a changing rate of a total error sum is smaller than a second threshold value $\epsilon_2$ when a total error sum obtained from the number of present iterations is compared to an error sum obtained from the number of previous iterations.

For example, when a phoneme combination {G+e, n+o, d+a, m+o} is included in a first partition of new partitions of FIG. 7, and names of present left and right phonemes of a first label file are d and a when a phoneme boundary is tuned, a first neural network is selected for tuning a phoneme boundary in the phoneme boundary tuning unit 15.

Because partition segmentation of a phoneme combination is performed without any concern to linguistic knowledge and only for minimizing a total error, a finally classified phoneme combination defined with this method guarantees an optimum phoneme combination classification with a minimum error.

Next, an optimum phoneme partition classifying method used in a learning procedure according to the present invention is evaluated. For performance evaluation, about 476,924 input vectors-output data are used, the number of total neural networks is set to 29, the composed neural network has one hidden layer, and the number of nodes in the hidden layer is set to 15. A β value of a sigmoid function is set to 2.0 and a learning gain η value of a learning time is set to 0.5. A threshold value of an error rate for convergence investigation during the back-propagation algorithm is limited to 0.001 and the number of iteration times for preventing an infinite loop is limited to maximum 300. Input vectors include 4 $13^{th}$ MFCC, SKLD, SFTR and ST-ZCR, and when analyzing MFCC, a frame length and a frame interval are set to 25 msec and 10 msec, respectively.

Table 1 shows a performance comparison of what assumes a phoneme boundary by using only the HMM in the described above and an experimental environment (related art 1), what tunes the phoneme boundary obtained from the HMM by using a single neural network (related art 2), what uses neural networks by phoneme group combinations based on the linguistic knowledge (related art 3), and what uses an optimum-partitioned classified neural network (present invention).

TABLE 1

| | method | RMSE (msec) | MAE (msec) | <20 msec(%) |
|---|---|---|---|---|
| related art 1 | only HMM | 12.51 | 8.91 | 91.99 |
| related art 2 | HMM+ single neural network | 12.20 | 7.70 | 91.73 |
| related art 3 | HMM+ neural networks by a phoneme group combination | 10.50 | 6.68 | 94.37 |
| present invention | HMM+ optimum-partitioned classified neural network | 10.13 | 6.23 | 95.17 |

By using multiple neural networks as in the prior art 3 and the present invention, the RMSE (Root Mean Square Error) and the MAE (Mean Absolute Error) are reduced in comparison to the related arts 1 and 2. Moreover, in comparison to the related art 3 with the pre-segmented phoneme group combinations, the present invention is improved by using an optimum-partitioned classified neural network in a learning procedure. Also, in the present invention, since a percentage of phonemes generating boundary errors within 20 msec in a 20 msec percentage accumulated error is over 95%, the automatic labeling is more practical.

Figure 8:
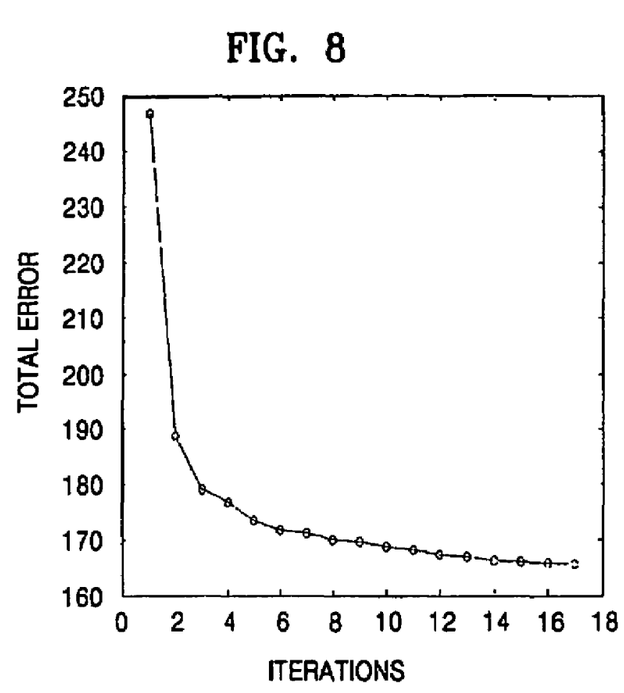
FIG. 8 is a graph which illustrates a total error of learning data versus the number of iterations during learning of the optimum-partitioned classified neural network according to the invention.

FIG. 8 illustrates a total error for learning data versus the number of iterations during learning of the optimum-partitioned classified neural network according to the present invention. The total error converges to a minimum error like in the case of using a single neural network. The total error almost converges in the initial iterations 1 through 5 of the total number of iterations because the initial neural networks are originated from learning data. When random values are used for initializing, the total error converges upon a greater number of iterations than above.

Figure 9:
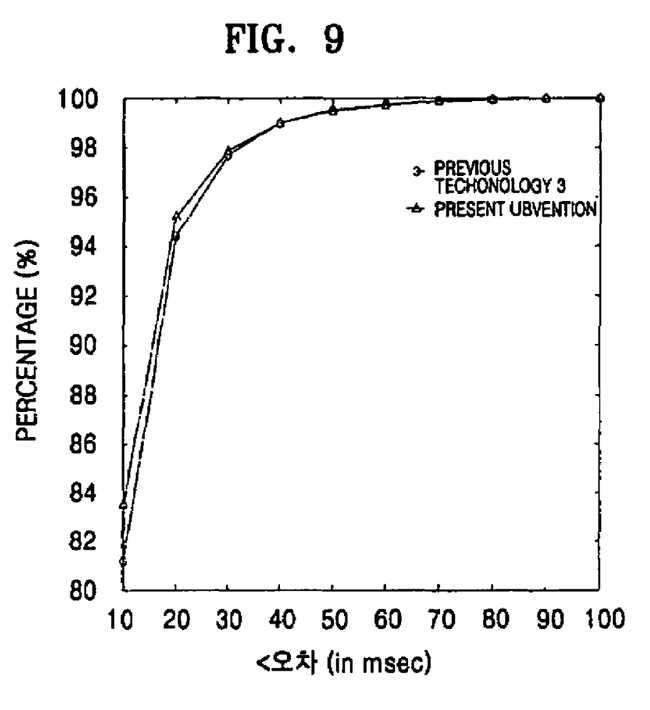
FIG. 9 is a graph for comparing percentage accumulation errors in a case of a neural network by phoneme group combination and a case of an optimum-partitioned classified neural network according to the invention.

FIG. 9 is a graph of comparing percentage accumulation errors of a neural network by phoneme group combination (prior art 3) and an optimum-partitioned classified neural network according to the present invention. As apparent from FIG. 9, the performance is generally improved by using the optimum-partitioned classified neural network. Over 95% of phonemes have errors within 20 msec, such percentage is considered a guide for label error tuning.

The present invention may be embodied in a general-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer readable medium having a computer readable program code unit embodied therein for causing a number of computer systems connected via a network to effect distributed processing. And the functional programs, codes and code segments for embodying the present invention may be easily deducted by programmers in the art which the present invention belongs to.

As described above, according to the present invention, since over 95% of phonemes have errors within 20 msec and consistency of the same synthesis unit can be maintained, by tuning a phoneme boundary of a first label file generated after an automatic labelling procedure by using an optimum-partitioned classified neural network and an optimum-partitioned classified result, mismatching may decrease when combination with a synthesis unit is performed. Finally, in addition to improving speech quality, a time for building a speech corpus for a TTS (Text-To-Speech) synthesis system is shortened.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of automatic labeling to tune a phoneme boundary of a first label file generated by performing automatic labeling of a manual label file, the method comprising:
    searching for neural networks having minimum errors with respect to a number of L phoneme combinations from a number of K neural network combinations generated at an initial stage or updated;
    updating weights during learning of the K neural networks by K phoneme combination groups searched with the same neural networks;
    composing an optimum-partitioned classified neural network combination using the K neural networks of which a total error sum has converged;
    tuning a phoneme boundary of a first label file using a phoneme combination group classification result and the optimum-partitioned classified neural network combination from the composing of the optimum-partitioned classified neural network combination; and
    generating a final label file reflecting the tuning result,
    wherein a phoneme boundary tuning field in the tuning of the phoneme boundary or the first label file and the generating a final label file reflecting the tuning result is set to a predetermined field of a duration time of left and right phonemes of the phoneme combination.

2. The method of claim 1, further comprising setting an output value of the neural network to 1 for the part applicable to a boundary between phonemes, setting the output value for the part not applicable to a boundary between phonemes to 0, and setting the output value for the part of 1 frame left or right apart from a phoneme boundary to 0.5.

3. The method of claim 1, further comprising setting the predetermined field to a length which divides the duration time of the left and right phonemes into three equal parts and segments one-third each to the left and right near each phonemic boundary of the first label file.

4. The method of claim 1, further comprising using a computer readable medium having recorded thereon a computer readable program code to tune the phoneme boundary of the first label file generated by performing automatic labeling of the manual label file.

5. An apparatus for automatic labeling using an optimum-partitioned classified neural network, comprising:
    a labeling unit to generate a first label file by performing automatic labeling for a manual label file;
    an optimum-partitioned classified neural network composing unit searching neural networks having minimum errors with respect to a number of L phoneme combinations from a number of K neural network combinations generated at an initial stage or updated, updating weights during learning of the K neural networks by K phoneme combination groups searched with the same neural networks, and composing an optimum-partitioned classified neural network combination using the K neural networks of which a total error sum has converged; and a phoneme boundary tuning unit tuning a phoneme boundary of the first label file by using a phoneme combination group classification result and the optimum-partitioned classified neural network combination supplied from the optimum-partitioned classified neural network composing unit, and generating a final label file reflecting the tuning result, wherein the phoneme boundary tuning field of the phoneme boundary tuning unit is set to a predetermined field of a duration time of left and right phonemes of the phoneme combination.

6. The apparatus of claim 5, wherein the optimum-partitioned classified neural network composing unit comprises:

a training corpus storing input variables, wherein the input variables include acoustic feature variables, additional variables, and a manual label file;

a minimum error classifying unit generating L phoneme combinations realized with names of left and right phonemes by using a phoneme boundary obtained from input variables and a manual label file stored in the training corpus, searching a neural network having minimum errors with respect to the L phoneme combinations from K neural network combinations generated or updated at an initial time, and classifying the L phoneme combinations into K phoneme combination groups searched with the same neural networks; and a re-training unit updating weights until individual errors of the neural networks have converged during learning with applicable learning data for the K neural networks by the K phoneme combination groups classified in the minimum error classifying unit and re-training the neural networks until a total error of the K neural networks, of which individual errors have converged, has converged.

7. The apparatus of claim 5, further comprising setting an output value of the neural network to 1 for the part applicable to a boundary between phonemes, setting the output value for the part not applicable to a boundary between phonemes to 0, and setting the output value for the part of 1 frame left or right apart from a phoneme boundary to 0.5.

8. The apparatus of claim 5, wherein the predetermined field is set to a length which divides the duration time of the left and right phonemes into three equal parts and segments one third each to the left and right near each phonemic boundary of the first label file.

9. An apparatus for automatic labeling using an optimum-partitioned classified neural network, comprising:

a labeling unit to perform automatic labeling of a manual label file and generate a first label file;

an optimum-partitioned classified neural network composing unit to receive input variables, segment phoneme combinations into partitions applicable to neural networks, and compose optimum-partitioned classified neural networks of Multi-Layer Perceptron-type from re-learned partitions; and a phoneme boundary tuning unit to tune a phoneme boundary of the first label file supplied from the labeling unit and to generate a final label file reflecting the tuning result, wherein the phoneme boundary tuning unit tunes the phoneme boundary by using the optimum-partitioned classified neural networks composed after completing learning in the optimum-partitioned classified neural network composing unit and judges the phoneme boundary according to whether an output of a neural network is 1 or 0 after applying the same input variable as the input variable used during the learning.

10. The apparatus of claim 9, wherein if there is a nonlinear clustering of neural networks of a Multi-Layer Perceptron-type, weights are determined by an iterative modification, wherein the iterative modification is performed by a back-propagation algorithm.

11. The apparatus of claim 9, wherein the optimum-partitioned classified neural network composing unit comprises:

a training corpus to store input variables, wherein the input variables comprise acoustic feature variables, additional variables, and a manual label file;

a minimum error classifying unit to generate phoneme combinations of names of left and right phonemes by using a phoneme boundary obtained from the input variables and manual label file stored in the training corpus, search an optimum neural network having a minimum error level relating to the phoneme combinations from neural network combinations of a Multi-Layer Perceptron-type, and classify the phoneme combinations into phoneme combination groups with the same neural networks; and a re-training unit to update weights of the neural networks by learning with applicable learning data for the neural networks as many as the predetermined number of iterations with respect to each of the phoneme combination groups classified in the minimum error classifying unit and converge a total error by adapting the updated weights to an applicable neural network in the neural network combinations.

12. A method of composing the optimum neural network combination minimizing a total error sum, comprising:

preparing an initial neural network combination using input variables;

searching for the optimum neural network having minimum errors with respect to the phoneme combinations from the initial neural network combination and classifying phoneme combinations with optimum neural networks;

merging phoneme combinations with the same neural network and classifying the merged phoneme combinations into new partitions;

updating each neural network and learning each neural network according to the partitions generated by the classifying and the merging;

determining whether all neural networks are converged, wherein if all neural networks are converged, composing the neural network combination as an optimum-partitioned classified neural network combination, and if all neural networks are not converged, then re-learning the optimum neural network having minimum errors by repeating the classifying, the merging, and the updating operations until all neural networks are converged.

13. The method of claim 12, wherein the preparing the initial neural network combination further comprises setting learning data for neural network learning and setting a first and a second threshold value.

14. The method of claim 13, further comprising repeatedly performing the updating of each neural network via a procedure that calculates the error using an updated neural network parameter, wherein the updating ends when all neural networks are converged.

15. The method of claim 14, wherein all neural networks are converged when an error-changing rate is less than the first threshold value.

16. The method of claim 12, wherein the setting learning data for neural network learning and the preparing the initial neural network combination further comprises setting an iteration times index to 0, setting an initial error sum to infinity, and preparing a position value of the phoneme boundary obtained by manual labeling.

17. The method of claim 12, further comprising calculating the total error for the classified phoneme combinations with optimum neural networks, wherein the total error is a sum of square errors between a target output and an output obtained when inputting all learning data of the phoneme combination to the neural network.

18. The method of claim 12, further comprising calculating the total error for the new partition.

19. The method of claim 12, further comprising calculating a weight update value to update each neural network.

20. The method of claim 12, further comprising updating the neural networks by setting the learning gain with a small value and setting the first threshold value for convergence investigation with a comparatively small value.

21. The method of claim 12, further comprising setting an output value of the neural network to 1 for the part applicable to a boundary between phonemes, setting the output value for the part not applicable to a boundary between phonemes to 0, and setting the output value for the part of 1 frame left or right apart from a phoneme boundary to 0.5.

22. The method of claim 12, further comprising assigning all input variables an applicable phoneme combination by seeking a nearest phoneme boundary from positions of input variables and deciding which name of two phonemes is connected to the boundary.

23. The method of claim 12, further comprising segmenting all input variables such that the number of total partitions is the square of the number of used phonemes.

24. The method of claim 23, further comprising setting the number of individual neural networks to the same value as or less than the number of partitions by a phoneme combination.

25. The method of claim 12, further comprising classifying the optimum neural network having minimum errors using the following equation:

$$c_i(P_j) = \arg\min_k \left[ \sum_{P_c(m)=j} \sum_{n \in W_m} |y^d(n) - F(\Phi_k^i, X(n))|^2 \right]$$

wherein $c_i(P_j)$ is an optimum neural network index in an $i^{th}$ iteration for a $j^{th}$ phoneme combination $(P_j)$, $W_m$ is a section in which input variables included in the $m^{th}$ phoneme boundary are selected.

26. The method of claim 25, further comprising selecting the input variables included in the $m^{th}$ phoneme boundary of the $W_m$ section according to the following equation:

$$W_m = \left[ n \left| \frac{t_{m-1} + t_m}{2} \leq n \leq \frac{t_m + t_{m+1}}{2} \right. \right]$$

wherein $t_m$ is a nearest frame index from a position of the $m^{th}$ phoneme boundary.

27. The method of claim 25, wherein the total error of a $k^{th}$ neural network is given as a sum of square errors between a target output and an output obtained in the case of inputting all learning data included in the phoneme combination to the $k^{th}$ neural network.

28. The method of claim 12, further comprising determining a total error for the new partitions using the following equation:

$$D_{i+1}(S^i) = \sum_{m=1}^{M} \sum_{P_j \in s_k^i} \min \left[ \sum_{P_c(m)=j} \sum_{n \in W_m} |y^d(n) - F(\Phi_k^i, X(n))|^2 \right]$$

wherein i is an iteration times index and $S^i$ is a partition at an $i^{th}$ iteration.

29. The method of claim 28, further comprising determining the $S^i$ partition at the $i^{th}$ iteration using the following equation:

$$S^i = s_1^i U s_2^i \ldots U s_k^i.$$

30. The method of claim 12, further comprising updating for individual neural networks and learning neural networks according to partitions generated by the classifying and the merging and determining weight update values using the following equation:

$$\Delta \Phi_k^i = \eta \sum_{s_i^k} \sum_{P_c(m)=j} \sum_{n \in W_m} |y^d(n) - F(\Phi_k^i, X(n))|^2].$$

31. The method of claim 12, further comprising determining whether all neural networks have converged by confirming whether there is a difference between a total error sum obtained from the current number of iterations and a total error sum obtained from the previous number of iteration using the following equation:

$$\Delta D = |D_{i+1}(C_i) - D_i(C_i)|$$

wherein if a changing rate of a total error sum is smaller than the second threshold value, the learning is finished.

32. A method of learning and updating a neural network, comprising:
  preparing initial neural network combinations composing neural networks of multi-layer perceptron-type;
  searching a multi-layer perceptron index having a minimum error in the initial neural network combinations of all phoneme combinations;
  classifying merged phoneme combinations into new partitions by merging phoneme combinations with the same multi-layer perceptron index if the multi-layer perceptron index having a minimum error for all phoneme combinations is searched; and
  re-training neural networks to update weights by learning data applicable to each partition, wherein the re-training procedure of individual neural networks calculates errors using the updated weights and repeating the re-training until a changing rate of errors becomes smaller than a first threshold value.

33. The method of claim 32, further comprising repeating the searching, classifying, and re-training operations until the changing rate of a total error sum is smaller than a second threshold value when the total error sum obtained from the number of present iterations is compared to an error sum obtained from the number of previous iterations.

34. The method of claim 33, wherein the partition segmentation of the phoneme combination is performed without relation to linguistic knowledge.

* * * * *

UNITED STATES PATENT AND TRADEMARK OFFICE
CERTIFICATE OF CORRECTION

PATENT NO.         : 7,444,282 B2                                          Page 1 of 1
APPLICATION NO. : 10/788301
DATED              : October 28, 2008
INVENTOR(S)        : Ki-hyun Choo et al.

It is certified that error appears in the above-identified patent and that said Letters Patent is hereby corrected as shown below:

Title page under item (56), Column 2 (Other Publications), Line 2, change "Tranactions" to --Transactions--.

Signed and Sealed this

Sixth Day of January, 2009

JON W. DUDAS
*Director of the United States Patent and Trademark Office*